Jan. 3, 1939.  F. PORTER  2,142,678
PREPARATION OF PHTHALIC ANHYDRIDE
Filed Dec. 31, 1934
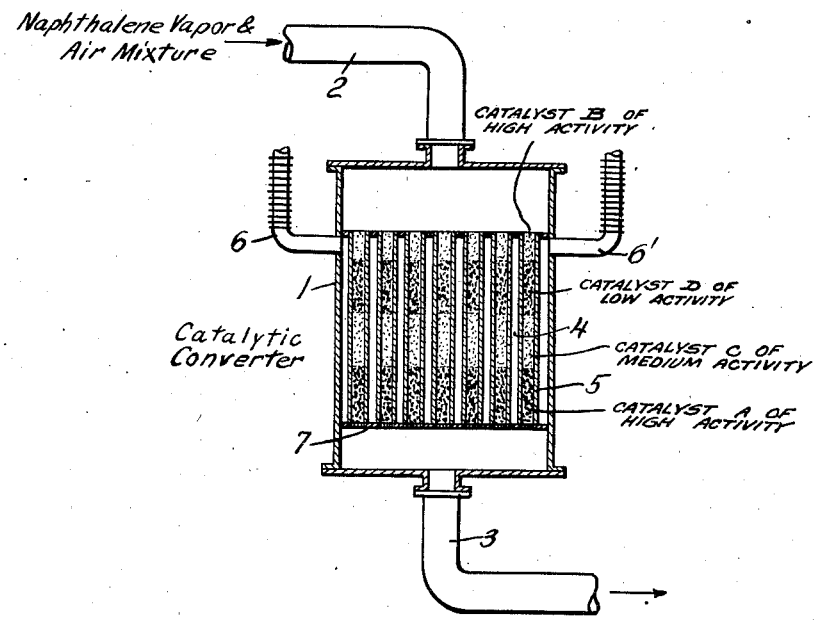
INVENTOR
Frank Porter
BY
ATTORNEY Patented Jan. 3, 1939

2,142,678

UNITED STATES PATENT OFFICE 2,142,678

PREPARATION OF PHTHALIC ANHYDRIDE

Frank Porter, Syracuse, N. Y., assignor, by mesne assignments, to The Solvay Process Company, New York, N. Y., a corporation of New York Application December 31, 1934, Serial No. 759,971

4 Claims. (Cl. 260—341)

This invention relates to the catalytic oxidation of aromatic hydrocarbons to produce phthalic anhydride. In particular it is directed to a new method for obtaining efficient operation of the catalytic converters normally employed for effecting this conversion.

In the catalytic partial oxidation of polynuclear aromatic hydrocarbons to phthalic anhydride a mixture of the aromatic hydrocarbon in vapor phase and a large excess of an oxidizing gas, for example air, is passed at an elevated temperature through a converter comprising a number of tubes of uniform cross-section containing a catalyst bed composed of an oxidation catalyst distributed on a suitable carrier, for instance vanadium oxide on a crushed alundum or crushed silica carrier.

The oxidation process is highly exothermal and hence it is necessary to provide ample means for removing heat from the catalyst so as to prevent rise in temperature of the catalyst bed above the maximum temperature desired for carrying out the process. If the temperature of reaction is permitted to become even temporarily elevated above the preferred maximum reaction temperature, for example above 600° C., the phthalic anhydride product formed is converted by the excess of oxygen present to carbon dioxide and water. This reaction gives off additional heat and further elevates the temperature. Accordingly it is desirable that the converter temperature be maintained constant and that ample cooling means be provided to prevent a running away of the reaction to complete combustion products.

In order to accomplish satisfactory cooling, many schemes have been devised; among the more practical methods is the use of a boiling body of liquid surrounding tubes of thermally conductive material containing the catalyst. The chamber for containing the boiling liquid is connected with reflux condensers which condense vapors and return them to the body of liquid. By controlling the pressure on the boiling liquid it may be maintained at the desired temperature. Mercury is one of the more common cooling media employed in this manner. Other types of external cooling of the catalyst also have been employed. For example cooling by means of a suitable fluid either gaseous or liquid, which absorbs the heat of reaction as sensible heat of the cooling fluid.

The present invention is applicable in general to processes involving any of the above or other types of external cooling wherever it is desired to employ a single cooling medium to control a substantial portion of the oxidation reaction. The expression "external cooling" is used herein to define cooling of the above types as distinguished from that type of operations wherein heat of reaction is absorbed adiabatically by the mixture of gases while they are undergoing reaction and hence there is no substantial abstraction of heat from the gases in the catalyst bed. The cooling contemplated need not reduce the temperature of the mixture but preferably abstracts just sufficient heat to maintain the temperature constant.

In order to effect complete reaction of hydrocarbons to phthalic anhydride, it is necessary that a substantial period of contact be used and therefore a catalyst bed of material depth in the direction of gas flow must be employed. The hydrocarbon-oxidizing gas mixture is normally passed vertically down through the catalyst bed. For simplicity of construction and operation, it is desirable that the catalyst be contained in a single converter having catalyst tubes of fairly uniform cross-section throughout the catalyst bed, or at any rate in not more than a pair of converters. The rate of reaction of the hydrocarbon with the oxidizing gas is much greater in the initial stages of the process when its concentration is high than in the later stages of the reaction. If in order to prevent excessive temperature rise where the reaction rate is high, for example in the upper part of the catalyst bed, the cooling medium is arranged to withdraw sufficient heat to keep this section within the required temperature range, the temperature of the gases in the later part of the contact period may be reduced below the desired temperature range. Such a reduction in temperature results in a quenching of the reaction, at least locally in the vicinity of the walls of the converter tubes, so that all of the hydrocarbon may not be properly oxidized. If an attempt is made to reduce the gas velocity to compensate for this effect, reduced outputs result and over-oxidation of that part of the phthalic anhydride remote from the walls of the converter takes place. Efforts to reduce the cooling effect in the lower portion of the converter by altering the construction or design of the converter give rise to objectionable and expensive complication of the apparatus.

In accordance with the present invention the objections resulting from varying temperature through the catalyst are overcome by varying the type of catalyst in the catalyst bed so that a uniform temperature is obtained although the catalyst in that portion of the bed contacting with the gases where the reaction rate is low is subjected to the action of a cooling medium having a temperature the same as where the reaction rate is high. For this purpose a stationary catalyst bed is employed having a varying activity in the direction of gas flow and specifically an activity varying from low or moderate activity where the reaction rate normally is high to a high activity where the reaction rate normally is low so that a relatively constant rate of reaction is maintained throughout the course of the oxidation.

In normal practice the hydrocarbon-oxidizing gas mixture enters the converter at a temperature somewhat below that preferred for complete oxidation of the hydrocarbon; thus, while the preferred temperature range is from about 450° C. to about 600° C., the mixture is preheated only to a temperature between 250° and 350° C. before entering the converter. Considerable additional heat is supplied to the entering gas mixture by radiation from the hot catalyst bed, but this is not sufficient to give the maximum efficiency of catalytic conversion in the early stage of the oxidation.

In order to overcome this objectionable feature, the invention further contemplates the use of an initiating catalyst of high activity to cause rapid oxidation during the first or initial stage of the oxidation reaction, this initiating catalyst being followed by a catalyst of lower activity to continue the oxidation as soon as the desired optimum temperature has been obtained by the gas mixture. The initiating catalyst promotes only a fraction of the total oxidation.

The present invention is applicable to converters cooled by a single cooling fluid exerting a relatively constant cooling effect on the catalyst in the several reaction zones whether the catalyst is arranged for horizontal or vertical (either upward or downward) flow. In order to simplify discussion, however, the invention will be herein considered in connection with the usual converter arrangement involving vertical downward flow of gas mixtures through the catalyst bed. Such a catalyst bed may be arranged having a highly active catalyst layer at the top thereof followed by catalyst layers of graduated activity from relatively low to high in a downward direction.

A large number of layers of catalysts of various activities may be employed so as to obtain a substantially continuous increase in activity from the catalyst of lowest activity in the section of the chamber near the entrance end thereof to the highly active catalyst in the section toward the exit end. However, it has been found that the advantages of this invention may be obtained to a high degree with only 2 or 3 such catalyst layers; say a catalyst of low activity followed first by a catalyst of intermediate activity and finally by a catalyst of high activity.

In the preferred arrangement an initiating catalyst of high activity precedes the catalyst of lowest activity as above described.

The varying degrees of catalyst activity may be obtained in a number of ways. Thus different catalysts having different activities may be employed in the various portions of the catalyst beds. The size of the catalyst granules or the manner or proportion in which the catalyst is disposed on a carrier or the size of the carrier particles may be varied to give the desired result. Thus the effect of high and low activity may be obtained by employing small granules of carrier in one section and large granules in a second section so that the effective surface of catalyst exposed per unit volume of catalyst space is greater in the first section than in the second. The effective catalyst activity may be reduced by dilution with non-catalytic materials or by inclusion of anticatalytic materials in the catalyst space. Various materials may be added to the catalyst for modifying its activity. Thus it has been found a phosphoric acid compound tends to decrease the activity of a vanadium oxide catalyst. By the addition of one or more of such modifying substances, or by varying the amounts thereof, their effect upon the catalyst and the consequent catalyst activity may be altered. I have found that a phosphoric acid compound used in a ratio of this compound calculated as $P_2O_5$ to vanadium oxide of from around 1:50 to 1:5 serves very well for this purpose. Such a compound may be incorporated in the catalyst by evaporation of a solution of the catalyst containing phosphoric acid in ratios of $H_3PO_4$ to $V_2O_5$ between 1:40 and 1:4. Phosphoric acid modified vanadiaum oxide catalysts and their use in catalytic vapor phase oxidation are the subject matter of my continuation application Serial No. 211,805, filed June 4, 1938, and hence this method of modifying the catalyst activity is not claimed specifically herein.

The present invention in its broad aspects contemplates the use of catalysts of graded activity regardless of the method by which the different activities in the several catalyst zones are obtained.

Any suitable oxidation catalyst may be employed, for instance vanadium oxide or a vanadate such as bismuth or tin vanadate. The two vanadates mentioned show especially high activity and hence may be used to advantage as initiators of the oxidation.

It is preferred, in order to secure the maximum catalyst efficiency, that the catalyst be distributed on a carrier which suitably increases the area of contact between catalyst and reaction mixture and further serves to mechanically support the catalyst and prevent packing thereof or crushing by the weight of the catalyst thereabove or by the action of the gases. Any of the known carriers may be used, for example crushed alundum or crushed silica brick.

In order that my invention may be more fully understood, the following discussion of one embodiment thereof is given in connection with the accompanying drawing wherein a converter I is shown hav'ng an inlet 2 for hydrocarbon vapor-oxidizing gas mixture and an outlet 3 for reaction products. In the central portion 4 of the converter I are located a number of tubes 5 adapted for containing a solid catalyst. The tubes as shown are cylindrical pipe sections having practically the same circumference and cross-sectional area throughout their length so that gases passing therethrough may have a substantially constant velocity and the cooling area is practically the same per unit volume of gas capacity. The space surrounding these tubes is filled with a suitable cooling fluid, for example liquid mercury. Condensers 6 and 6' are provided for the condensation of mercury vapor and its return to the body of liquid mercury in the central portion of the converter. A plate (or plates) 7 is arranged to support the catalyst in the tubes 5. The plate is of course perforated so as to permit the passage of gases therethrough.

For the preparation of a catalyst bed having an initiating zone and three subsequent reaction zones, the following compositions, which are of decreasing activity in the order set forth, may be used:—

A. 90 parts of crushed alundum ($Al_2O_3$) carrier having distributed thereon 10 parts vanadium oxide catalyst ($V_2O_5$).

B. 90 parts crushed alundum ($Al_2O_3$) carrier having distributed thereon 5 parts vanadium oxide catalyst.

C. 90 parts crushed alundum carrier having distributed thereon a mixture of 9.74 parts vanadium oxide catalyst and 0.26 parts of phosphoric aicd compound (calculated as $P_2O_5$).

D. 90 parts crushed alundum carrier having distributed thereon a mixture of 9 parts vanadium oxide catalyst and 1 part of phosphoric acid compound (calculated at $P_2O_5$).

The catalysts A, B, C, and D may be made by dissolving vanadium oxide (obtainable by treatment of ammonium vanadate with concentrated nitric acid), in concentrated hydrochloric acid, amounts of phosphoric acid equivalent to the stated amounts of $P_2O_5$ being added to this solution in the preparation of catalysts C and D. Crushed alundum, say 8–14 mesh, then may be added and the solution evaporated to dryness with frequent stirring. In this manner the catalyst or catalyst mixture is uniformly distributed upon the carrier.

The series of catalysts just described may be employed in the above apparatus as follows: The converter 1, having a total capacity of 18 parts by volume, may be charged with 5 parts of catalyst A at the bottom; on top of this are added 5 parts of catalyst C, and next 5 parts of catalyst D. These three beds containing catalysts A, C, and D and possessing increasing activity in the direction of gas flow constitute the main reaction section of the converter. On top of catalyst D is spread an initiating layer composed of about 3 parts of catalyst B.

In the partial oxidation of naphthalene to phthalic anhydride the operation of the catalytic converter charged as above, may be as follows. A naphthalene vapor-air mixture containing around 1 part by weight of naphthalene for each 30 parts of air (representing a molar or volume ratio of about 1:130) and preheated to a temperature between 250° and 350° C., is introduced through vapor inlet 2 to converter 1. Upon striking the initiating catalyst bed, B, the mixture, whose temperature has been considerably raised by radiation, say to 450° C., immediately reacts to further raise its temperature, in passing through this zone, to the optimum reaction temperature, i. e. between about 500° and about 550° C. The period of contact is sufficient for only a small part of the oxidation to be effected before the mixture passes into catalyst D at substantially the optimum reaction temperature for conversion of naphthalene to phthalic anhydride. The catalyst D is of relatively low activity so that the reaction rate previously attained in the active catalyst B is not substantially exceeded as the gases pass through this catalyst. Since the naphthalene is being constantly used up and its concentration thus lowered, by the time the reaction mixture reaches the margin betwen catalysts D and C there is a tendency for the reaction to become slower. At this point the higher activity of the catalyst C puts new life into the lagging reaction and hence no substantial diminution in reaction rate takes place. As the gases pass through catalyst C their naphthalene content, of course, becomes further reduced with a coresponding tendency to reduce the reaction rate and the temperature, but before any substantial rate reduction has occurred, the gases pass into the highly active catalyst A, which speeds up the oxidation and gives an average rate approximating that in C and D. The gas velocity is substantially constant through the tubes of the converter. While some $CO_2$ and water vapor are produced which may increase the volume of gas treated and hence its velocity, this increase is not large. When finer carrier granules are employed in the more active later zones of catalyst, the gas space in the tubes may be reduced somewhat but this also will result in only a small increase in velocity so that it may be regarded as approximately constant.

The rate of reaction of the gases passing through all of sections A, C, and D is substantially the same, that is though the rate may fluctuate some, the fluctuations are not great and the temperaure is mainained relatively constant, say between 500° and 550° C. Accordingly the heat evolved is practically constant for the various zones and the lower portion of the catalyst bed requires the same cooling effect as the upper portion. As a consequence the temperature of the gases is kept well within the desired reaction range and no objectionable drop takes place as the gases reach the exit end of the converter.

The gases leaving the converter at outlet 3 may be treated in the usual manner for the recovery of phthalic anhydride, maleic acid, and waste gases. Thus they may be cooled to condense phthalic anhydride and subsequently scrubbed with water or other scrubbing medium for removing maleic acid. The remaining gases may be exhausted or in part recirculated for use of a further portion of their oxygen content.

By carrying out the process as described above, a most efficient use of catalyst is obtained and increased life of catalyst beds results. By maintaining the optimum temperature throughout the catalyst mass formation of tarry materials, which frequently occurs in the usual processes is greatly diminished and the presence of unoxidized naphthalene in the product is avoided. Likewise the chance of obtaining over-oxidation of phthalic anhydride by irregular cooling conditions is minimized.

The following example shows an alternative catalyst bed wherein the variation of effective catalyst activity is obtained by varying the proportion of vanadium oxide distributed on the carrier. Five catalysts are charged into a converter of the externally cooled type in the following order in the direction of gas flow:

E. 90 parts crushed alundum and 10 parts vanadium oxide;

F. 97 parts crushed alundum, 3 parts vanadium oxide;

G. 99.5 parts crushed alundum, ½ part vanadium oxide;

H. 99 parts crushed alundum, 1 part vanadium oxide;

I. A catalyst composition the same as F; and

J. A catalyst composition the same as E.

For a converter having a total depth of catalyst of 24 inches and arranged for vertical downward flow of gases, the top 2 inches may comprise catalyst E, the next two inches catalyst F, the next six inches catalyst G, the next 5 inches catalyst H, the next 5 inches catalyst I, and the last 4 inches catalyst J. The top 4 inches of the catalyst bed serve as the initiating zone of active catalyst of slightly diminished activity in the second half to compensate for the rise in temperature attained in the first two inches. The remaining four catalyst layers give conditions of progressively increasing activity in the direction of gas flow.

It will be understood that in the appended claims the expression "oxygen-containing gas" is employed to indicate a gas containing molecular oxygen and not merely oxygen compounds.

I claim:

1. In the preparation of phthalic anhydride by the catalytic oxidation of polynuclear aromatic hydrocarbons in vapor phase, the improvement which comprises passing a mixture of the aromatic hydrocarbon and an oxidizing gas into brief contact with an oxidation catalyst of high activity to initiate the oxidation and then passing the mixture into contact with a catalyst of reduced activity said catalysts being disposed in a bed of uniform cross-section subjected to external cooling by a medium having about the same temperature throughout the length of the bed.

2. In the preparation of phthalic anhydride by the catalytic oxidation of polynuclear aromatic hydrocarbons in vapor phase, the improvement which comprises passing a mixture of the aromatic hydrocarbon and an oxidizing gas through a single catalyst bed of uniform cross-section subjected to external cooling by a medium having about the same temperature throughout the length of the catalyst bed, said bed comprising an oxidation catalyst of high activity to initiate the oxidation, followed progressively by a catalyst of reduced activity and a catalyst of high activity, whereby excessive temperature variation during the oxidation of the mixture is avoided.

3. In the preparation of phthalic anhydride by the catalytic oxidation of naphthalene in vapor phase, the method which comprises passing a mixture of naphthalene in vapor phase and air through a small amount of highly active oxidation catalyst whereby the oxidation is initiated and the temperature of the mixture is raised to the optimum reaction temperature, passing the mixture immediately upon attainment of said reaction temperature through an externally cooled oxidation catalyst of low activity, and then through an oxidation catalyst of high activity cooled by the same cooling medium so as to maintain the mixture at the optimum reaction temperature substantially throughout the oxidation of the naphthalene.

4. In the preparation of phthalic anhydride by the catalytic oxidation of naphthalene in vapor phase, the method which comprises heating a mixture of naphthalene vapor and air to between 250° and 350° C., passing the mixture of naphthalene vapor and air through a small amount of highly active vanadium oxide oxidation catalyst whereby the oxidation is initiated and the temperature of the mixture is raised to a temperature between 450° C. and 550° C., passing the mixture immediately upon attainment of said temperature through an externally cooled oxidation catalyst of low activity and then through an oxidation catalyst of high activity cooled by the same cooling medium so as to maintain the mixture at the optimum reaction temperature substantially throughout the oxidation of the naphthalene.

FRANK PORTER.